United States Patent [19]
Mueller

[11] 3,861,275
[45] Jan. 21, 1975

[54] DUPLICATING DEVICE FOR GRINDING OR MILLING MACHINES

[75] Inventor: Josef Mueller, Stuttgart-Fasenenhof, Germany

[73] Assignee: Fortuna-Werke Maschinenfabrik AG, Stuttgart, Germany

[22] Filed: Sept. 13, 1973

[21] Appl. No.: 397,097

[52] U.S. Cl. .................. 90/13.4, 51/101 R, 51/277
[51] Int. Cl. ......................... B23b 1/18, B24b 17/00
[58] Field of Search ...... 51/101 R, 105 R, 277, 237; 90/13.4, 13.7, 13.9, 13 R

[56] References Cited
UNITED STATES PATENTS
3,057,120  10/1962  Yingst ............................. 51/101 R
3,618,464  11/1971  Michaud, Sr. ...................... 90/13 R FOREIGN PATENTS OR APPLICATIONS
237,052   7/1911   Germany ............................ 90/13.4

Primary Examiner—Gil Weidenfeld
Attorney, Agent, or Firm—Michael S. Striker

[57] ABSTRACT

A duplicating device for grinding or milling machines in which a copying roller is turnably mounted on the frame of the machine and in which a workpiece holder adapted to carry a workpiece to be machined carries a template having a contour to which the workpiece is to be machined. The workpiece holder is mounted on the machine frame turnable about an axis parallel to that of the copying roller and movable transverse thereto so that the contour of the template is held in engagement with the copying roller. The workpiece holder includes fine adjusting means for adjusting the position of a workpiece carried thereby and that of the template relative to each other.

10 Claims, 3 Drawing Figures

DUPLICATING DEVICE FOR GRINDING OR MILLING MACHINES

BACKGROUND OF THE INVENTION

The present invention relates to a duplicating device for grinding and milling machines with a template which, on one hand, is fixedly connected to a workpiece holder and which, on the other hand, is held with its contour to which the workpiece is to be machined, in engagement with a copying roller which is turned about a fixed axis, whereby the workpiece holder and the template mounted thereon are rotatable by a drive.

Especially during machining of trochoidal-shaped burner chambers, the workpiece is provided with two bores the position of which relative to the trochoidal-shaped burner chamber is exactly determined, and the workpiece holder is provided with dowel pins, or preferably expansion bolts, adapted to be inserted into the aforementioned bores. In this way a workpiece may be held in an exactly defined position on the workpiece holder. A template with a contour to which the workpiece is to be machined is mounted on the workpiece holder on the side thereof opposite the workpiece carried thereby. The position of the template must be exactly adjusted with relation to the aforementioned dowel pins or expansion bolts since the position of the burner chamber to be machined in the workpiece will depend on such exact positioning of the template. In known duplicating devices it is not possible to provide on the workpiece holder dowel pins for the template since the position of such additional dowel pins can, for reason of manufacturing, not exactly be determined with regard to the dowel pins which are coordinated with the workpiece. This makes it necessary to adjust the position of the workpiece and the template relative to each other. This is done in known duplicating devices in such a manner that the template before fixing its position on the workpiece holder is moved by hand to the correct position. Thereby, considerable difficulties are encountered since such adjustment of the template requires considerable dexterity of the operator and since the template has no reference axes for determining the final adjusted position thereof.

SUMMARY OF THE INVENTION

It is an object of the present invention to provide a duplicating device for grinding or milling machines of the aforementioned kind by means of which an extremely exact relative position between workpiece and template may be obtained within a short time and in which the disadvantages of duplicating devices known in the art are avoided.

It is a further object of the present invention to provide a duplicating device of the aforementioned kind, which is composed of relatively few and simple parts so that the device may be manufactured at reasonable cost and will stand up perfectly under extended use.

With these and other objects in view, which will become apparent as the description proceeds, the workpiece holder for the duplicating device according to the present invention is provided with means for fine adjusting the position of a workpiece on a workpiece holder and that of a template carried thereby relative to each other.

According to a preferred construction, the workpiece is turnable by the aforementioned means about an axis which is parallel or identical with the axis of rotation of the template and movable in two directions normal to each other and each extending radial with regard to the aforementioned axis.

An especially advantageous construction is derived if the workpiece holder is provided with a first carrier member for supporting the workpiece and the first carrier member is mounted on a second carrier member turnable about an axis which is parallel or identical with the axis of rotation of the template and the second carrier member, in turn, is mounted on a main body of the workpiece holder, to which the template is fixedly connected, movable in two directions normal to each other and each extending radial to the aforementioned axis. This arrangement has the advantage that, during adjustments of the position of the workpiece in one direction, the position of the workpiece in all other directions will remain unchanged.

In the last-mentioned construction it is advantageous to hold the workpiece by means of dowel pins or expansion bolts on the first carrier and the template by means of dowel pins or expansion bolts on the main body of the workpiece holder.

This has the advantage that for the adjustment a set-up template may be placed on the corresponding dowel pins instead of the production template and instead of the workpiece a corresponding set-up template be used, whereby if necessary dowel pins with different position may be provided for the second set-up template. These set-up templates can be manufactured to very exact dimensions with straight reference edges which may be positioned with regard to each other by adjusting the aforementioned fine adjusting means. The necessary adjustment of the two set-up templates can be exactly determined by known measuring instruments or gauges so that the necessary adjustment may be carried out quickly and exactly with the device according to the present invention.

The novel features which are considered as characteristic for the invention are set forth in particular in the appended claims. The invention itself, however, both as to its construction and the method of operation, together with additional objects and advantages thereof, will be best understood from the following description of specific embodiments when read in connection with the accompanying drawings.

DESCRIPTION OF THE PREFERRED EMBODIMENTS

Figure 1:
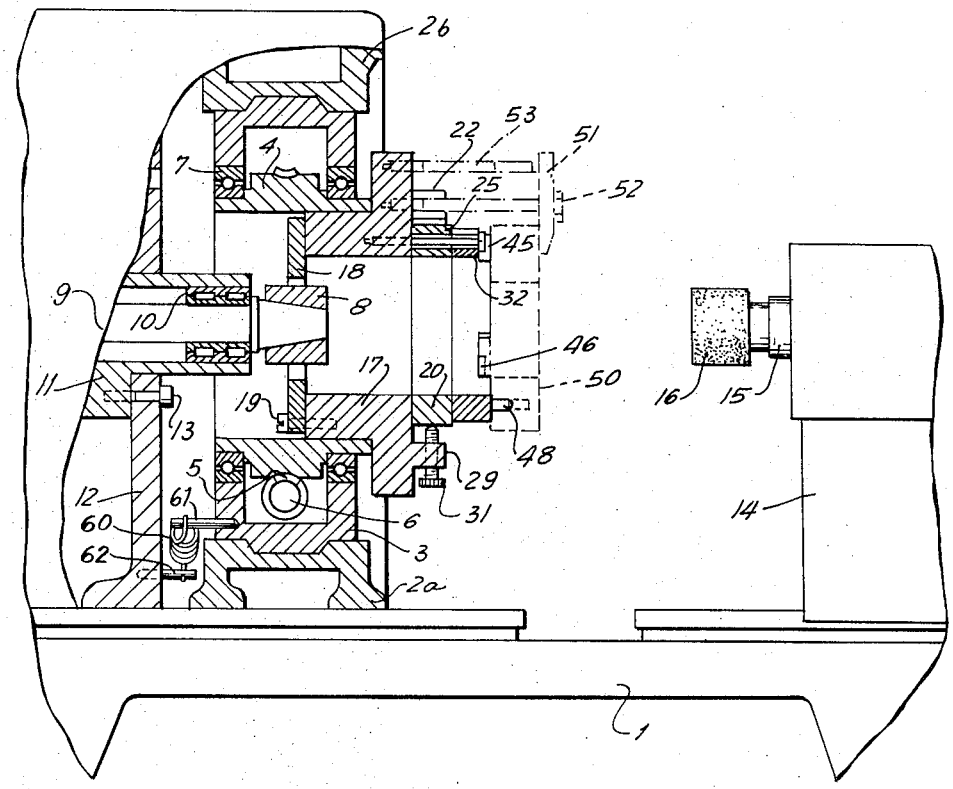
FIG. 1 is a side view of a duplicating grinding machine provided with the duplicating device according to the present invention, shown partly sectioned along the line I—I of FIG. 2.

FIG. 1 schematically illustrates the construction of a duplicating grinding machine to be provided with the duplicating device according to the present invention. As shown in FIG. 1, the machine comprises a bed 1 on which a lower guide 2a and an upper guide 2b, extending transverse to the elongation of the bed 1, are mounted. A slide 3 carrying a hollow spindle 4 is slidably guided in the aforementioned guides. The hollow spindle 4 is turnably mounted by means of roller bearings 7 in the slide 3 and is rotable (thereby moved), from drive means not shown in the drawing, over a worm 6 and a worm gear 5 connected to this spindle 4. The machine includes further a copying roller 8 fixed to the shaft 9 which is turnably mounted by means of needle bearings 10 in a spindle housing 11. The spindle housing 11 in turn is mounted on a frame 12, for instance by screws, and the frame is fixedly connected in any known manner to the bed 1 of the machine. The machine includes further a tool slide 14 mounted on the bed 1 movable in longitudinal direction thereof and the tool slide carries a tool spindle 15 to the free end of which a tool, for instance a grinding wheel 16, is connected for rotation with the spindle 15. The tool spindle 15 is rotated in a known manner by means not shown in the drawing.

Figure 2:
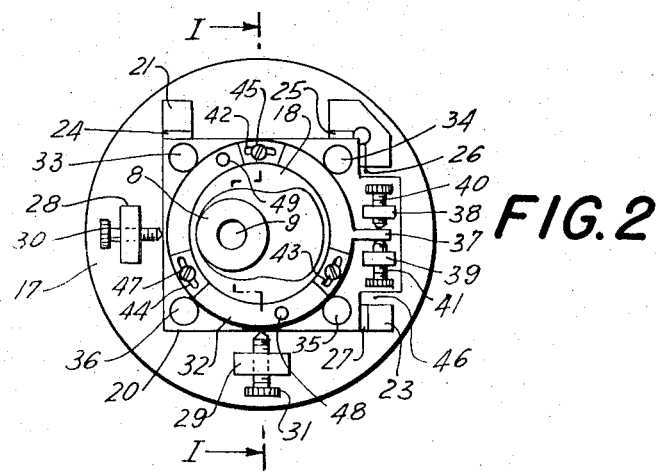
FIG. 2 is an end view of the workpiece holder according to the present invention as seen from the end to which the workpiece is to be connected.

The workpiece holder according to the present invention comprises a main body 17 substantially in the form of a hollow cylinder to one end face of which a template 18 is connected by means of screws 19. The slide 3 is, in a known manner, for instance by a tension spring 60, biased in such a way that the template 18 on the workpiece holder is maintained in engagement with the roller 8 while the template is rotated. The spring 60 is fixedly connected at its opposite ends by bolts 61 and 62 respectively to the slide 3 and the frame 12. Instead of the spring 60 other known biasing means may also be used as for instance shown in the German Pat. No. 237,052 or in the U.S. Pat. No. 3,057,120. A carrier element 20 abuts against the opposite end face of the main body 17. The carrier member 20 is adjustable in two directions which are normal to each other and which extend in radial direction from the axis of rotation about which the main body 17 is turnable. For this purpose stop members 21, 22 and 23, as best shown in FIG. 2, project from the other end face of the main body 17 and each having an abutment fact extending normal to the aforementioned opposite end face of the main body. A plurality of small plate-shaped spacer members 24, 25, 26 and 27 of selected thickness may be placed between the abutment faces of the stop members and corresponding side faces of the carrier element 20 extending parallel to the abutment faces. Set screws 28 and 29 are mounted in correspondingly threaded bores of projections 28 and 29 projecting from the aforementined end face of the main body by means of which the carrier element 20 may be pressed against the abutment faces of the stop members 21, 22 and 23 respectively against the plate-shaped spacer members 24, 25, 26 and 27 sandwiched between the abutment faces on the stop members and the corresponding side faces of the carrier member 20. By placing plate-shaped spacer members of suitable thickness between the stop members and the side faces of the carrier member 20, the position of the latter may be very exactly adjusted in two directions normal to each other and such adjustment may be reproduced any time. The plate-shaped spacer members are made from steel and are available at predetermined thicknesses differing only slightly from each other and Johnson gauge blocks are especially suitable for this purpose.

Another, annular carrier member 32 with a peripheral surface of circular outline is mounted on the outer end face of the carrier member 20 and held thereon turnable about its axis by means of guide rollers 33, 34, 35 and 36. A projection 37 projects radially from the peripheral surface of the carrier member 32 which can be clamped between two adjusting screws 40 and 41 which are threaded into corresponding bores of blocks 38 and 39 projecting from the end face of the carrier member 20. A plurality of fixing bolts, for instance three fixing bolts 45, 46 and 47 extend through elongated openings 42, 43 and 44 of the two carrier members and which are screwed in correspondingly threaded bores of the main body 17 serve to hold the carrier members 20 and 32 in adjusted position onto the main body 17. The elongated openings have to have dimensions large enough so that the two carrier members may be properly adjusted with respect to each other and to the main body 17.

Two dowel pins 48 and 49, press fitted in corresponding bores of the carrier member 32, project from the outer end face thereof and are adapted to extend in corresponding bores of the workpiece to be machined so as to fix the position of the workpiece relative to the carrier member 32. Instead of dowel pins expansion bolts may also be used, which when expanded will hold the workpiece without any pay thereon.

A workpiece 50, indicated in dotted lines in FIG. 1, may be held by a clamping member 51 which abuts against the end of a bolt 53 screwed into a bore in the main body 17 and which can be clamped against the aforementioned bolt and the workpiece by means of a clamping bolt 52.

Figure 3:
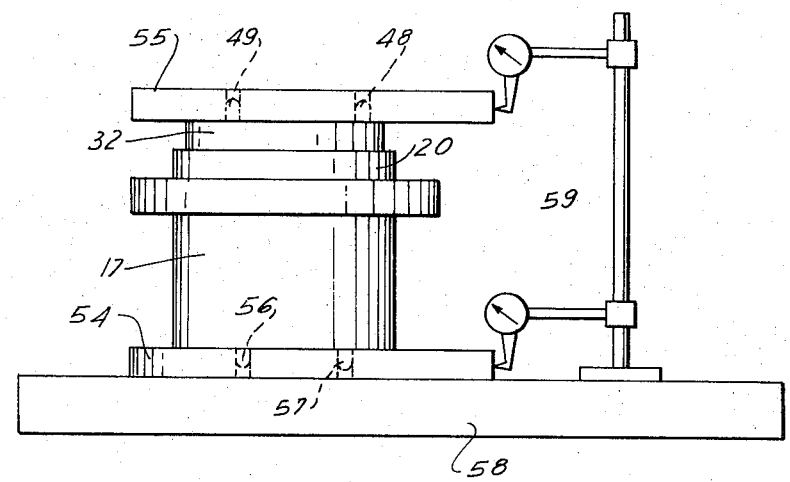
FIG. 3 is a schematic side view of the workpiece holder in which set-up templates are mounted instead of a production template and a workpiece on opposite ends of the duplicating device.

The necessary adjustment of the position of the two carrier elements may be carried out quickly and extremely accurate as will be explained in connection with FIG. 3. As shown therein, two set-up templates 54 and 55 are respectively mounted on opposite ends of the workpiece holder which comprises the main body 17, and the carrier elements 20 and 32. The set-up template 55 is provided, in correspondence with the workpiece to be machined, with bores for receiving the dowel pins 48 and 49 and the other set-up template 54 is provided in correspondence with the subsequently used working template with bores for receiving the dowel pins 56 and 57. The two set-up templates 54 and 55, which respectively replace during the set-up the working template 18 and the workpiece 15 to be machined, are provided with easily accessible reference edges. The thus-formed assembly may be placed on a plate 58 having an upper exactly planar surface and by proper adjustment of the two carrier elements 20 and 32 the two set-up templates are brought into proper position corresponding to the desired relative position of the working template and the workpiece to be machined. By properly dimensioning the set-up template such proper position may correspond to a position in which the reference edges for instance the right edges, as shown in FIG. 3 of the two set-up templates are aligned with each other in a plane normal to the upper face of the plate 58 and this position may be easily checked by a measuring device 59 schematically shown in FIG. 3, and comprising for instance two dial gauges adapted to engage the reference edges of the two templates. After the adjustment is carried out, the fixing bolts 45, 46 and 47 are tightened so that the adjustment will be positively maintained. Subsequently thereto, the two set-up templates 54 and 55 are removed from the workpiece holder and the working template 18 is placed onto the dowel pins 56 and 57 and held thereon, for instance by the aforementioned screw 19 whereas the workpiece is placed onto the dowel pins 48 and 49. Subsequently thereto, the workpiece holder is placed into the spindle 4, whereafter machining of the workpiece may be started.

It will be understood that each of the elements described above, or two or more together, may also find a useful application in other types of duplicating devices for grinding or milling machines differeing from the type described above.

While the invention has been illustrated and described as embodied in a duplicating device for grinding or milling machines, it is not intended to be limited to the features shown, since various modifications and structural changes may be made without departing in any way from the spirit of the invention.

Thus for instance it is evidently also possible to mount the working template on adjustable carrier members and the workpiece directly on the main body of the workpiece holder. It is also possible to carry out the adjustment of the carrier elements in another manner than that shown in the drawing.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a duplicating device for machines with a rotary material removing tool, a combination comprising support means; a copying roller rotatably mounted on said support means about a predetermined axis; a workpiece holder means for carrying a workpiece; a template having a contour to which a workpiece carried by said workpiece holder means is to be machined; means mounting said workpiece holder means on said support means turnable about an axis parallel to said predetermined axis and movable transverse thereto for holding said copying roller in engagement with said contour; means for rotating said workpiece holder means about its axis; means on said workpiece holder means for finely adjusting the position of a workpiece carried by said workpiece holder means and the position of said template relative to each other; and tool means including a rotary tool spindle, a material removing tool fixed to said spindle for rotation therewith, and a tool slide mounted on said support means movable in axial direction of said tool spindle toward and away from said workpiece holder means.

2. A combination as defined in claim 1, wherein said template is fixedly mounted on said workpiece holder and wherein said fine adjustment means serves to adjust the position of a workpiece relative to that of said template.

3. A combination as defined in claim 2, wherein said fine adjusting means comprises means for adjusting the position of a workpiece by turning the latter about an axis parallel with that about which said workpiece holder is turned and for moving said workpiece in two directions normal to each other and extending in radial direction with respect to the last-mentioned axis.

4. A combination as defined in claim 3, wherein said workpiece holder means comprises a main body having an axis and being mounted on said support means turnable about said axis and movable transverse thereto, said fine adjustment means comprising a first carrier member for carrying a workpiece, a second carrier member carrying said first carrier member turnable about an axis parallel with said axis of rotation of said main body, means mounting said second carrier member on said main body adjustable in two directions normal to each other and extending radially with respect to the last-mentioned axis.

5. a combination as defined in claim 4, wherein said main body has a pair of end faces normal to its axis, said template being fixed to one of said end faces and including at least two stop members projecting from the other of said end faces and each having at least one abutment face normal to said other end face, said second carrier member having side faces parallel to said abutment faces, a plurality of plate-shaped spacer members of different thickness selectively insertable between said side faces and said abutment faces, and means on said main body for pressing said second carrier member towards said stop members so as to hold said side faces in engagement with the respective spacer members and the latter in engagement with said abutment faces.

6. A combination as defined in claim 4, wherein said first carrier member comprises an annular member having an outer peripheral surface of circular outline, at least three guide rollers on said second carrier member engaging said outer peripheral surface and mounting said annular member turnable about its axis, and cooperating means on said annular member and said second carrier member for fixedly holding said annular member in an adjusted turned position.

7. A combination as defined in claim 4, and including means for fixedly holding said first carrier member in an adjusted turned position on said second carrier member and the latter in an adjusted position on said main body.

8. A combination as defined in claim 4, and including holding means for holding a workpiece in exact position on said first carrier member and said template in exact position on said main body.

9. A combination as defined in claim 8, wherein said holding means comprise dowel pins respectively insertable into bores of said workpiece and said template.

10. A combination as defined in claim 9, and including a pair of set-up templates having reference edges and being provided with bores for receiving said dowel pins so that said set-up templates may be placed on said dowel pins to respectively replace the template used during the machining operation and the workpiece during set-up of the duplicating device.

* * * * *